United States Patent
Lin

(10) Patent No.: US 9,760,775 B1
(45) Date of Patent: Sep. 12, 2017

(54) RETINA IDENTIFYING MODULE

(71) Applicant: Wu-Hsu Lin, Taichung (TW)

(72) Inventor: Wu-Hsu Lin, Taichung (TW)

(*) Notice: Subject to any disclaimer, the term of this patent is extended or adjusted under 35 U.S.C. 154(b) by 0 days.

(21) Appl. No.: 15/165,769

(22) Filed: May 26, 2016

(51) Int. Cl.
   *G06K 9/00* (2006.01)

(52) U.S. Cl.
   CPC .............................. *G06K 9/00617* (2013.01)

(58) Field of Classification Search
   CPC ........... G06K 9/00617; G06K 9/00604; G06K 9/00597; G06K 9/0061; G06K 9/00288; H04L 9/3231
   USPC .................................................. 382/115–124
   See application file for complete search history.

(56) References Cited

U.S. PATENT DOCUMENTS

| | | | | |
|---|---|---|---|---|
| 6,594,377 B1* | 7/2003 | Kim | ................... | G06K 9/00597 382/117 |
| 2013/0135513 A1* | 5/2013 | Choi | ................... | A61B 5/0077 348/335 |
| 2013/0218601 A1* | 8/2013 | Webb | ................... | G06Q 20/3552 705/3 |
| 2014/0218497 A1* | 8/2014 | Hanna | ................... | G06K 9/00604 348/78 |
| 2015/0098630 A1* | 4/2015 | Perna | ................... | G06K 9/00604 382/117 |
| 2016/0350594 A1* | 12/2016 | McDonald | ......... | G06K 9/00604 |

* cited by examiner

*Primary Examiner* — Samir Ahmed
(74) *Attorney, Agent, or Firm* — Rabin & Berdo, P.C.

(57) ABSTRACT

A retina identifying module has a retina identifying chip and an encapsulation body. The encapsulation body is transparent, is mounted on and enclosing the retina identifying chip, and has a convex top face. Accordingly, the thickness of the retina identifying module can be effectively reduced.

2 Claims, 4 Drawing Sheets

RETINA IDENTIFYING MODULE

BACKGROUND OF THE INVENTION

1. Field of the Invention

The present invention relates to a retina identifying module, and more particularly to a retina identifying module that has a reduced thickness.

2. Description of Related Art

To prevent unauthorized use of an object or unauthorized entrances to a place, an object or a gateway of a place is usually provided with an identifying device. The conventional identifying devices are applied to identify a person by the unique features of the person, such as fingerprints or retina. With reference to FIG. 4, a conventional retina identify module comprises a retina identifying chip 40 and a camera shot 50. The retina identifying chip 40 is mounted on a circuit board. The camera shot 50 is mounted on a top of the retina identifying chip 40 to project the retina image of a person to the retina identifying chip 40. Accordingly, the retina identifying chip 40 can identify a person being an authorized one or not.

However, with the camera shot 50 mounted on the top of the retina identifying chip 40, the conventional retina identifying module has a thick thickness. Therefore, the conventional retina identifying module cannot be applied on a thin object, such as a smart card, so the conventional retina identifying module is not versatile in use.

To overcome the shortcomings, the present invention tends to provide a retina identifying module to mitigate or obviate the aforementioned problems.

SUMMARY OF THE INVENTION

The main objective of the invention is to provide a retina identifying module that has a reduced thickness and can be applied to a thin object.

The retina identifying module has a retina identifying chip and an encapsulation body. The encapsulation body is transparent, is mounted on and encloses the retina identifying chip, and has a convex top face.

Other objects, advantages and novel features of the invention will become more apparent from the following detailed description when taken in conjunction with the accompanying drawings.

DETAILED DESCRIPTION OF PREFERRED EMBODIMENT

Figure 1:
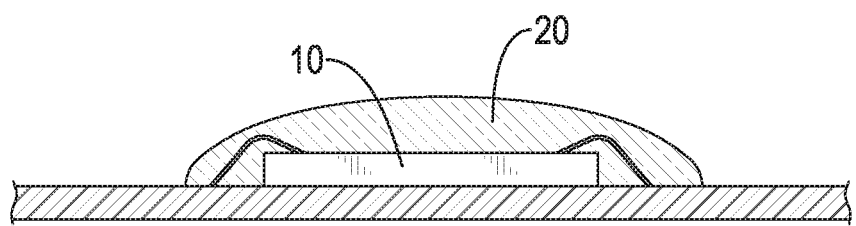
FIG. 1 is an enlarged side view in partial section of a first embodiment of a retina identifying module in accordance with the present invention.

With reference to FIG. 1, a retina identifying module in accordance with the present invention comprises a retina identifying chip 10 and an encapsulation body 20. The retina identifying chip 10 is mounted on a circuit board and is electrically connected with the circuit of the circuit board with wires. The encapsulation body 20 is transparent, is mounted on and encloses the retina identifying chip 10, and has a convex top face.

Figure 2:
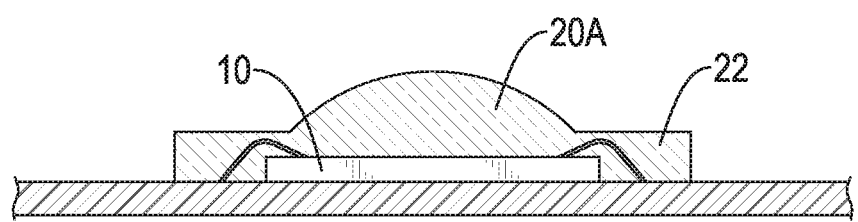
FIG. 2 is an enlarged side view in partial section of a second embodiment of a retina identifying module in accordance with the present invention.

With reference to FIG. 2, in a second embodiment, the encapsulation body 20A further has a foundation segment 22 having a flat top, and the convex top face is formed on the flat top of the foundation segment 22.

Figure 3:
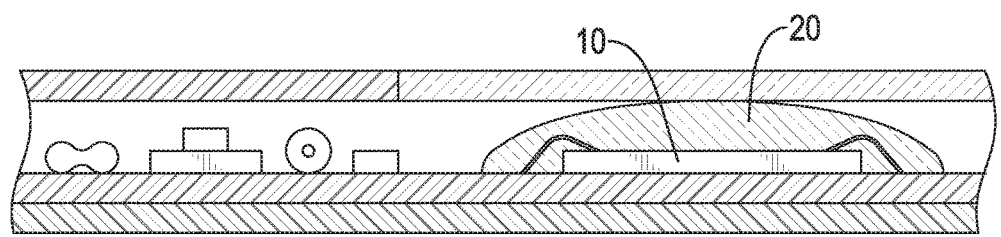
FIG. 3 is an operational side view in partial section the retina identifying module in FIG. 1 being applied to a card.
Figure 4:
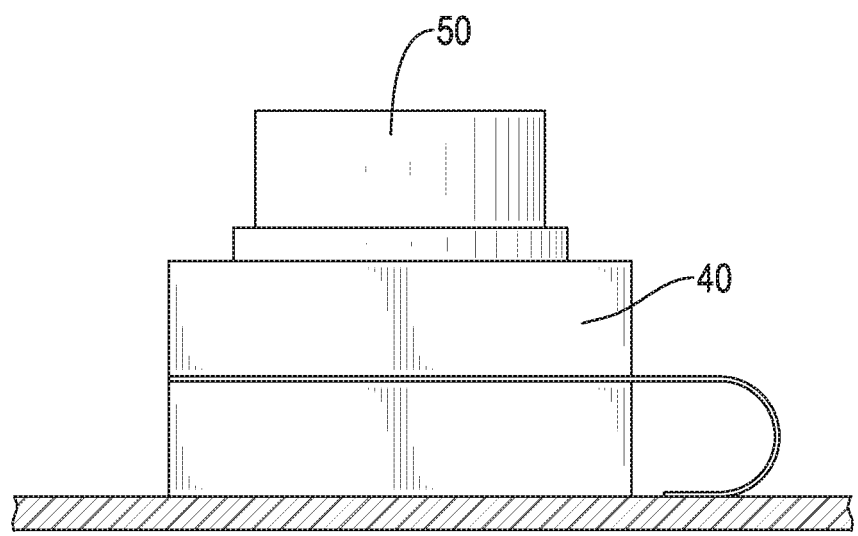
FIG. 4 is a side view of a conventional retina identify module.

With such an arrangement, the convex top face of the encapsulation body 20,20A can be served as a lens. Consequently, when a person poses his eye close to the convex top face of the encapsulation body 20,20A, the image of retina can be projected to the retina identifying chip 10 via the convex top face of the encapsulation body 20,20A to identify the person. Accordingly, a camera shot is unnecessary, and the thickness of the retina identifying module can be effectively reduced. Thus, the retina identifying module can be applied to a thin object, such as a card as shown in FIG. 3, so the retina identifying module is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retina identifying module comprising:
   a retina identifying chip; and
   an encapsulation body being transparent, mounted on and enclosing the retina identifying chip, and having a convex top face.

2. The retina identifying module as claimed in claim 1, wherein the encapsulation body further has a foundation segment having a flat top; and
   the convex top face is formed on the flat top of the foundation segment.

\* \* \* \* \*